US008096816B2

(12) United States Patent
Kossak et al.

(10) Patent No.: US 8,096,816 B2
(45) Date of Patent: Jan. 17, 2012

(54) BEAM CLAMP

(75) Inventors: Robert W. Kossak, Lemont, IL (US);
Robert L. Sokol, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/114,843

(22) Filed: May 24, 2011

(65) Prior Publication Data

US 2011/0223814 A1 Sep. 15, 2011

Related U.S. Application Data

(63) Continuation of application No. 12/419,596, filed on Apr. 7, 2009, now Pat. No. 7,988,464.

(60) Provisional application No. 61/143,865, filed on Jan. 12, 2009, provisional application No. 61/043,528, filed on Apr. 9, 2008.

(51) Int. Cl.
H01R 4/66 (2006.01)

(52) U.S. Cl. .......................................... 439/92; 439/803

(58) Field of Classification Search ............... 439/92, 439/803; 174/94 S, 94 R
See application file for complete search history.

(56) References Cited

U.S. PATENT DOCUMENTS

| 1,559,349 | A | 10/1925 | Mott |
| 2,529,153 | A | 11/1950 | Hain |
| 3,232,393 | A | 2/1966 | Attwood |
| 3,604,676 | A | 9/1971 | Weber |
| 4,083,624 | A * | 4/1978 | Timmer .................. 439/803 |
| 4,863,390 | A | 9/1989 | Cera et al. |
| 4,884,976 | A | 12/1989 | Franks, Jr. |
| 5,240,423 | A | 8/1993 | Morrison |
| 5,286,211 | A | 2/1994 | McIntosh |
| 5,649,445 | A | 7/1997 | Lavoie et al. |
| 5,966,982 | A | 10/1999 | Mello et al. |
| 5,997,368 | A | 12/1999 | Mello et al. |
| 6,533,605 | B1 * | 3/2003 | Reuter .................. 439/431 |
| 6,649,840 | B2 | 11/2003 | Triantopoulos et al. |
| 6,898,905 | B1 | 5/2005 | Kirschner |
| 6,986,673 | B2 | 1/2006 | De La Borbolla |
| 6,989,491 | B2 | 1/2006 | Triantopoulos et al. |
| 7,173,187 | B2 | 2/2007 | Triantopoulos et al. |
| 7,306,489 | B2 | 12/2007 | Werthman et al. |

(Continued)

FOREIGN PATENT DOCUMENTS

DE 8413068 U1 10/1984

(Continued)

OTHER PUBLICATIONS

U.S. Appl. No. 61/876,799, filed Feb. 13, 2001, Mello.

(Continued)

Primary Examiner — Hien Vu
(74) Attorney, Agent, or Firm — Robert A. McCann; Christopher S. Clancy; James H. Williams

(57) ABSTRACT

Certain embodiments of the present invention provide a clamp for securing a grounding connector to a structural member. The clamp includes a clamp body having a top section, a bottom section, and a side section, which define an opening for receiving the structural member. The top section includes a plurality of mounting sections separated by at least one slot. Each of the mounting sections includes a mounting hole for receiving a mounting fastener to secure the clamp to the structural member.

12 Claims, 14 Drawing Sheets

U.S. PATENT DOCUMENTS

| | | |
|---|---|---|
| 7,670,153 B2 | 3/2010 | Kulig |
| 2008/0172952 A1 | 7/2008 | Gall |
| 2009/0004895 A1 | 1/2009 | Duley |

FOREIGN PATENT DOCUMENTS

| | | |
|---|---|---|
| DE | 10025077 A1 | 4/2001 |
| DE | 102004013324 A1 | 10/2005 |
| JP | 2007059117 A | 3/2007 |

OTHER PUBLICATIONS

Burndy Grounding, Type YGIB Groundlink Connector, catalog pp. D-18 & D-19, undated.

Thomas & Betts, Color-Keyed EZ Ground Compression Connectors, catalog p. F92, 2002.

* cited by examiner

BEAM CLAMP

CROSS-REFERENCE TO RELATED APPLICATION

This application is a continuation of U.S. patent application Ser. No. 12/419,596, filed on Apr. 7, 2009, which claims priority to U.S. Provisional Patent Application No. 61/143,865, filed on Jan. 12, 2009, and U.S. Provisional Patent Application No. 61/043,528, filed on Apr. 9, 2008. The subject matter of each of the patent applications listed above is incorporated by reference in its entirety.

BACKGROUND OF THE INVENTION

The present invention relates to a clamp for securing a grounding connector to a structural member, such as a beam. More particularly, the present invention relates to a beam clamp having one or more of the following features: (1) a split mount; (2) alternate mounting locations; (3) lug locators; and (4) reinforcing ribs.

Currently available clamps include a single mounting section and a plurality of mounting fasteners for securing the clamp to the beam. However, because of the single mounting section, the mounting fasteners counteract each other when tightened. That is, tightening one mounting fastener loosens the other mounting fasteners, establishing a relatively weak mechanical connection to the beam. To establish an adequate mechanical connection, the mounting fasteners may be tightened incrementally in an alternating pattern, adding time and complexity to the installation process.

Additionally, the grounding connector is connected to the outside of the clamp. That is, the grounding connector is not in direct contact with the beam, establishing a weak electrical connection to the beam, as well as adding time and complexity to the installation process. To establish an adequate electrical connection, the clamp may be made of a conductive material, which is typically more expensive than a comparable non-conductive material.

Therefore, there is a need for a clamp that is capable of establishing a strong mechanical connection with the structural member and a strong electrical connection with the grounding connector. Additionally, there is a need for a clamp that is capable of being installed quickly and easily.

SUMMARY OF THE INVENTION

Certain embodiments of the present invention provide a clamp for securing a grounding connector to a structural member. The clamp includes a clamp body having a top section, a bottom section, and a side section, which define an opening for receiving the structural member. The top section includes a plurality of mounting sections separated by at least one slot. Each of the mounting sections includes a mounting hole for receiving a mounting fastener to secure the clamp to the structural member.

DETAILED DESCRIPTION OF THE INVENTION

FIGS. 1-9 illustrate a split mount beam clamp 100 according to a first embodiment of the present invention.

Figure 1:
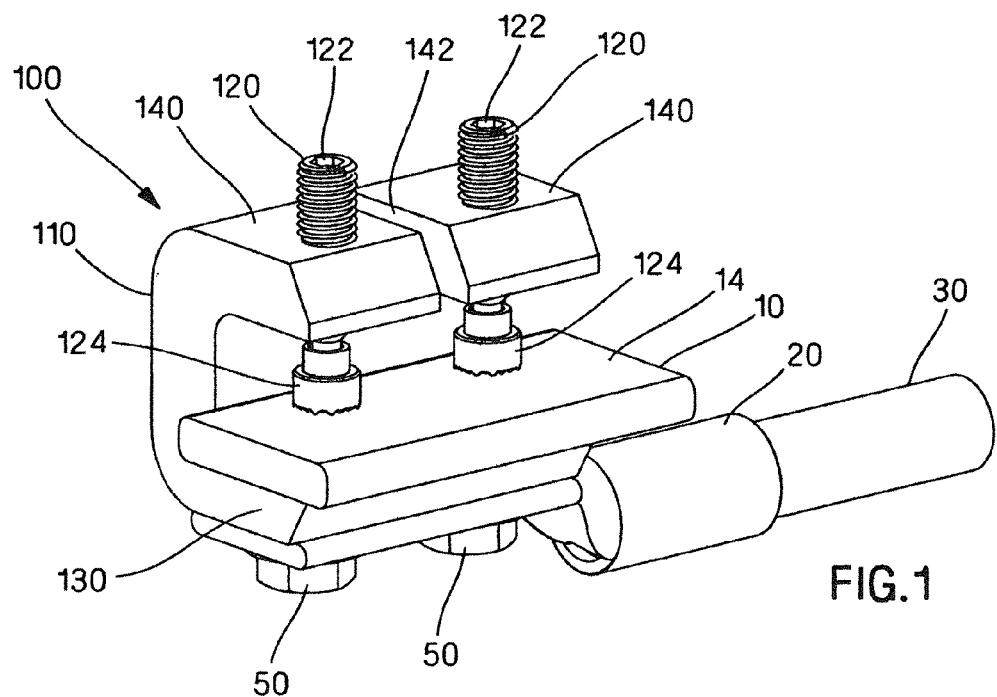
FIG. 1 is a top front perspective view of a split mount beam clamp according to a first embodiment of the present invention.
Figure 2:
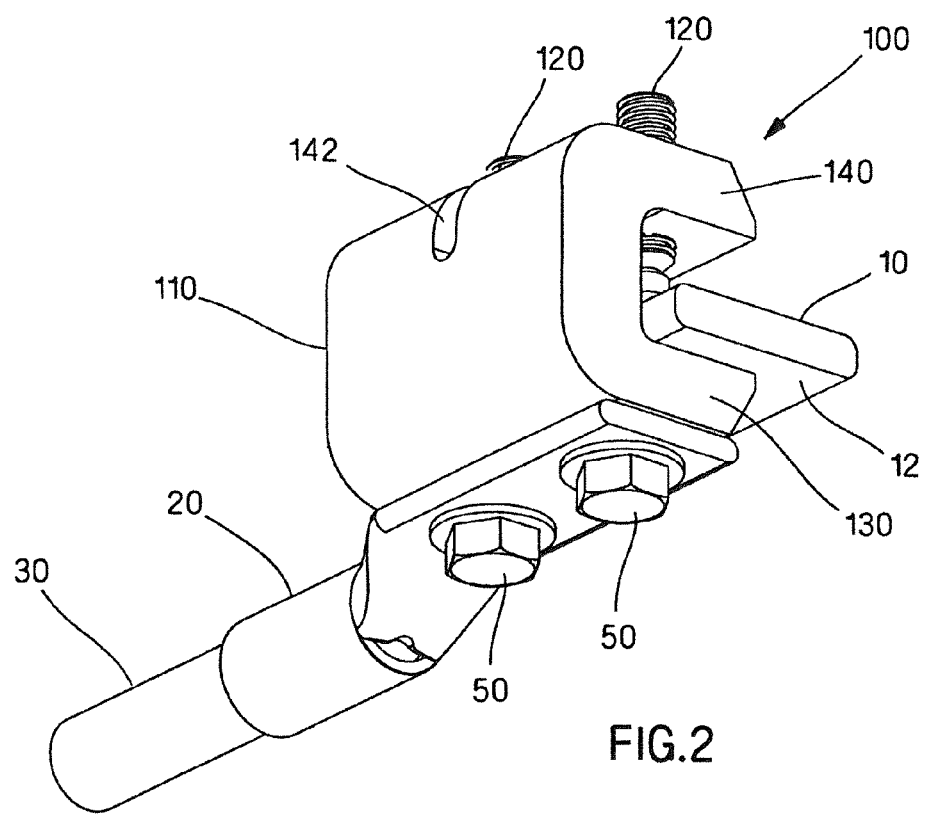
FIG. 2 is a bottom front perspective view of the split mount beam clamp of FIG. 1.
Figure 3:
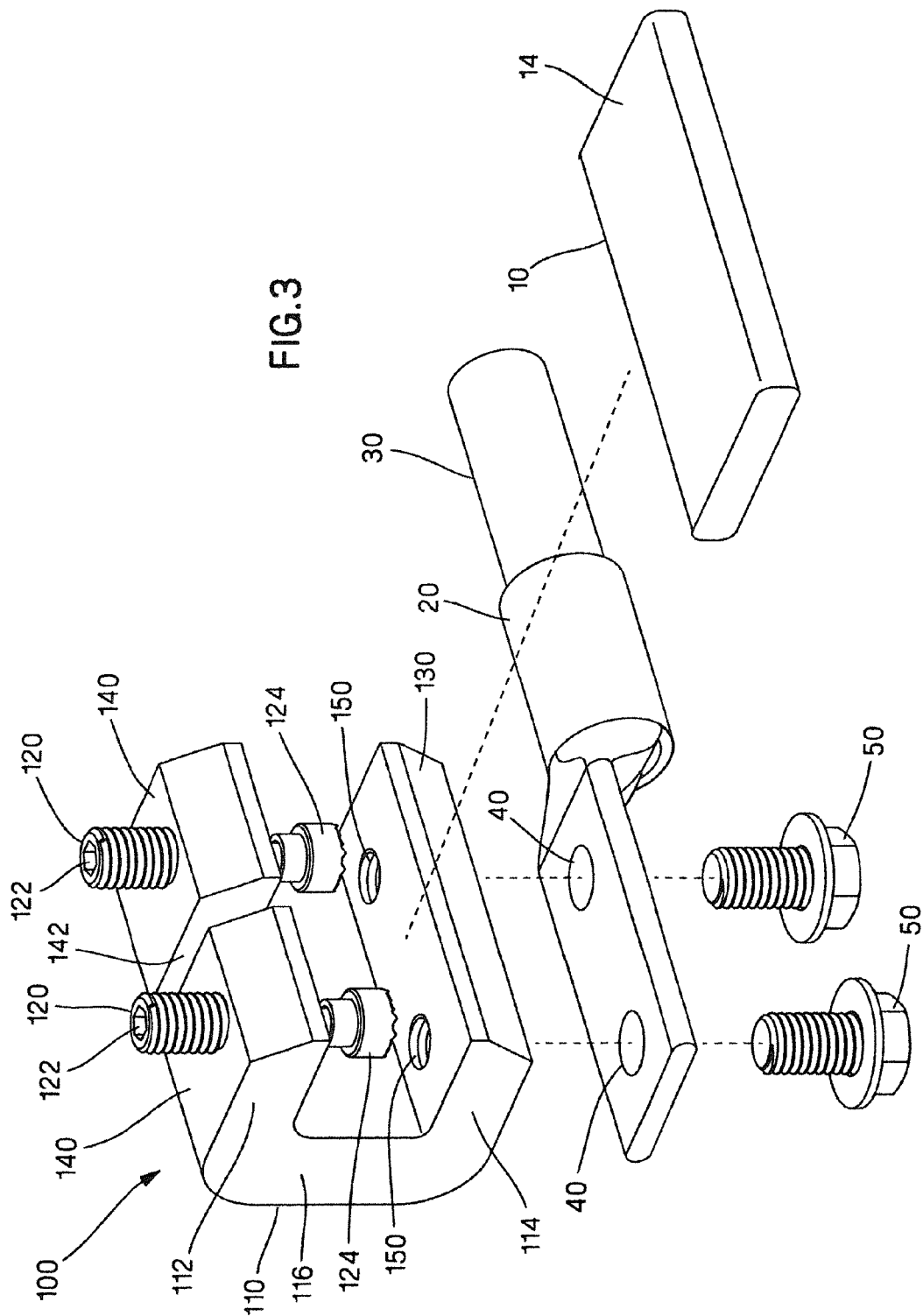
FIG. 3 is an exploded top front perspective view of the split mount beam clamp of FIG. 1.

As best seen in FIG. 1 and FIG. 2, the split mount beam clamp 100 is connected to a structural member 10, such as a beam or a channel. A grounding connector 20, such as a PANDUIT® LCC-W Grounding Connector, is connected to the split mount beam clamp 100 and one or more electrical conductors 30, such as cable or wire, thereby establishing a grounding connection to the structural member 10 (see also FIG. 7 and FIG. 9). As best seen in FIG. 3, the grounding connector 20 includes one or more grounding holes 40. The grounding holes 40 are adapted to receive one or more grounding fasteners 50, such as bolts or screws. For example, as shown in FIG. 1 and FIG. 2, a PANDUIT® LCC-W Grounding Connector 20 is crimped to a ground wire 30 and bolted to the split mount beam clamp 100 using two bolts 50. It is likewise contemplated that the split mount beam clamp 100 may accommodate other types of grounding connectors 20, including any number of grounding holes 40 and grounding fasteners 50. Additionally, the grounding connector 20 may also be referred to as a grounding lug 20.

Figure 4:
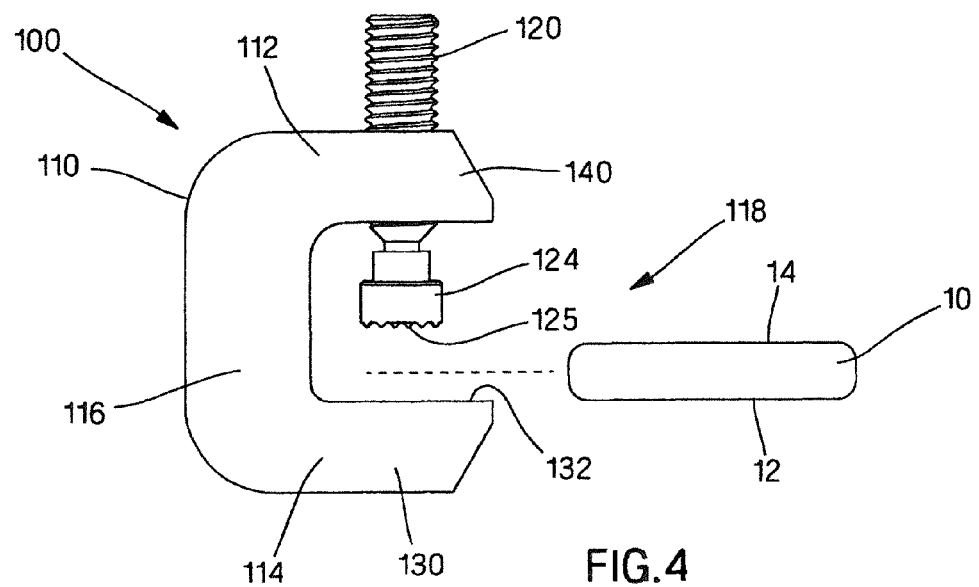
FIG. 4 is a front view of the split mount beam clamp of FIG. 1, showing the structural member removed therefrom.

As best seen in FIG. 3, the split mount beam clamp 100 includes a clamp body 110 and one or more mounting fasteners 120, such as bolts or screws. The clamp body 110 is generally C-shaped and includes a top section 112, a bottom section 114, and a left side section 116, corresponding to the top, the bottom, and the left side of the clamp body 110, as shown in FIG. 4. The right side of the clamp body 110 includes an opening 118, also as shown in FIG. 4.

Figure 6:
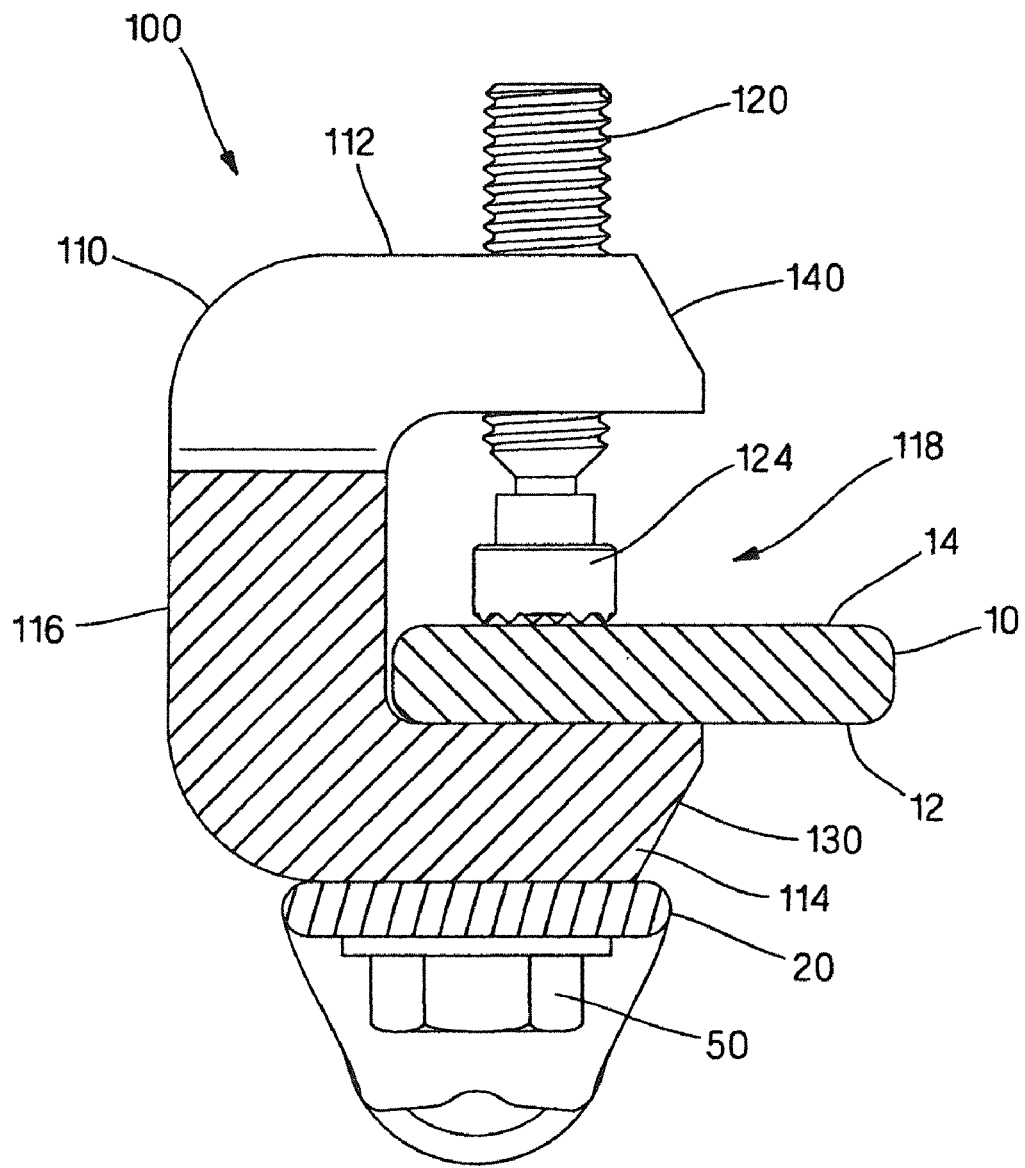
FIG. 6 is a cross-sectional view taken along line 6-6 of FIG. 5.

As best seen in FIG. 3, the clamp body 110 includes one or more contacting sections 130. For example, as shown in FIG. 3, the bottom section 114 of the clamp body 110 includes one contacting section 130. The contacting section 130 is adapted to engage the structural member 10 when the split mount beam clamp 100 is attached thereto. More particularly, as best seen in FIG. 4 and FIG. 6, a top surface 132 of the contacting section 130 is adapted to engage a bottom surface 12 of the structural member 10 when the split mount beam clamp 100 is attached thereto. Additionally, as best seen in FIG. 4 and FIG. 6, the top surface 132 of the contacting section 130 is smooth. Alternatively, the top surface 132 of the contacting section 130 may be serrated, which improves the connection between the split mount beam clamp 100 and the structural member 10.

Figure 5:
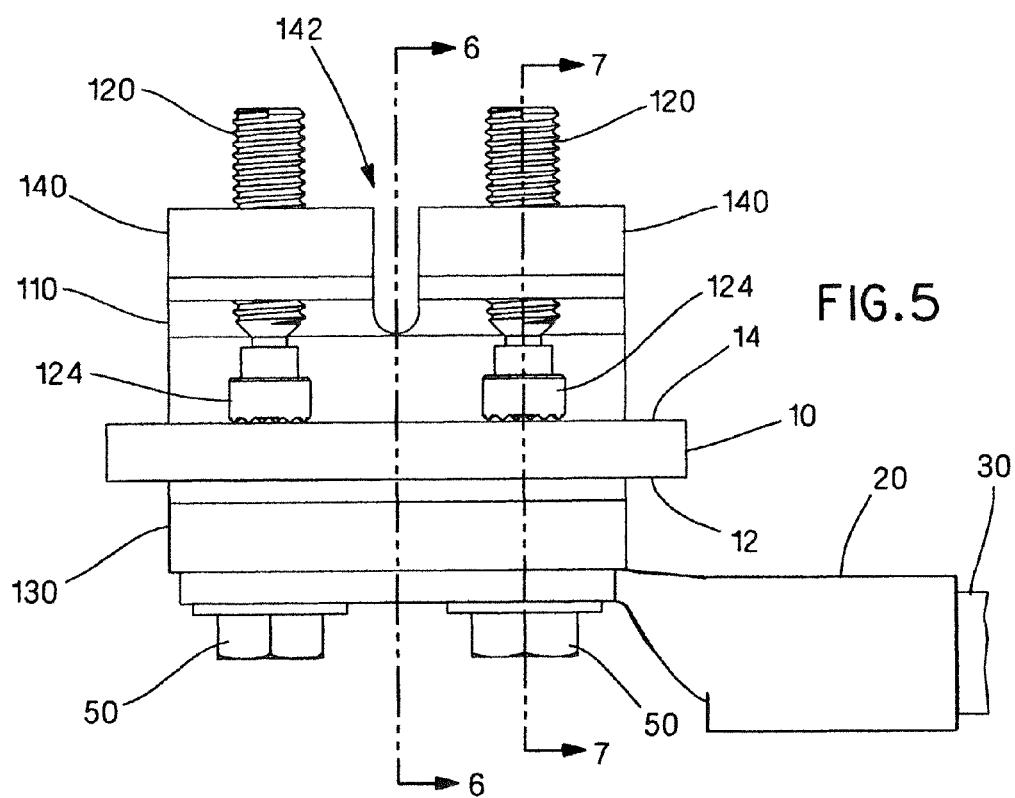
FIG. 5 is a side view of the split mount beam clamp of FIG. 1.
Figure 7:
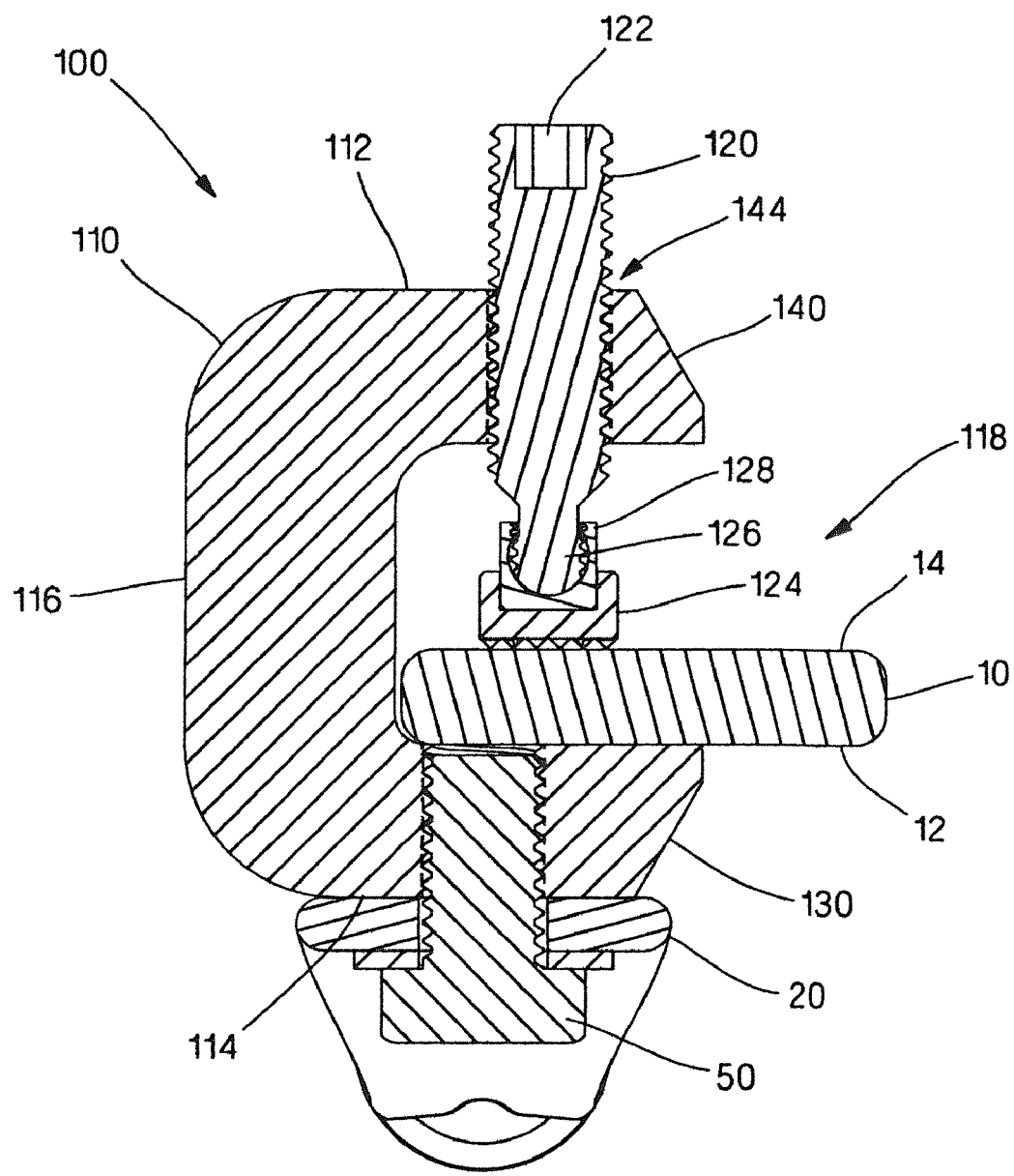
FIG. 7 is a cross-sectional view taken along line 7-7 of FIG. 5.
Figure 9:
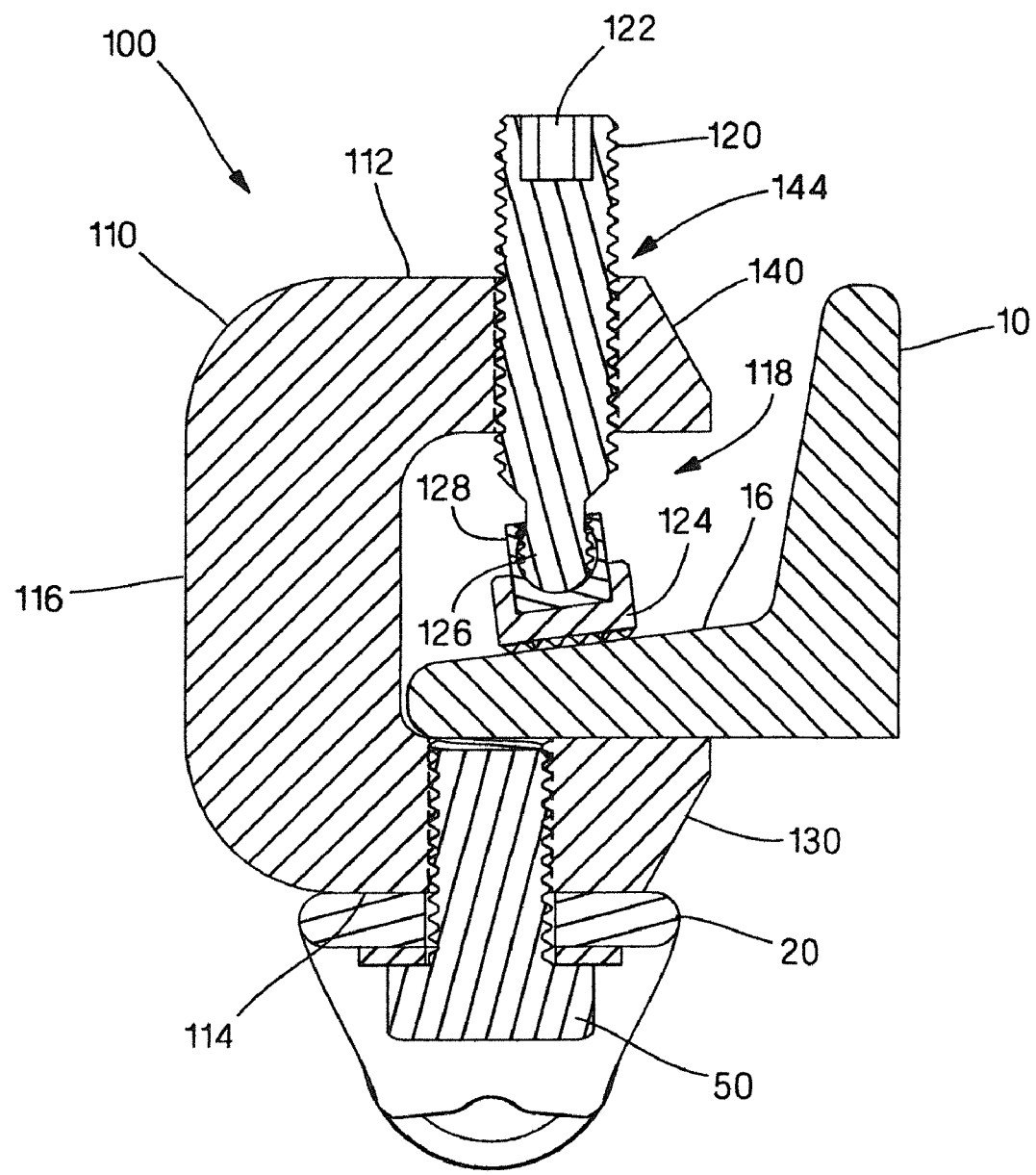
FIG. 9 is a cross-sectional view taken along line 9-9 of FIG. 8.

Additionally, as best seen in FIG. 3, the clamp body 110 includes a plurality of mounting sections 140. For example, as shown in FIG. 3, the top section 112 of the clamp body 110 includes two mounting sections 140. As best seen in FIG. 5, a slot 142 separates the mounting sections 140. As best seen in FIG. 7 and FIG. 9, each of the mounting sections 140 includes a mounting hole 144 for receiving one of the mounting fasteners 120. It is likewise contemplated that the split mount beam clamp 100 may include any number of mounting fasteners 120, and that the clamp body 110 may include any number of mounting sections 140, mounting slots 142, and mounting holes 144. Additionally, it is likewise contemplated that the split mount beam clamp 100 may include other types of split mounts (e.g., multiple contacting sections 130).

As best seen in FIG. 7, each of the mounting fasteners 120 includes a hex pocket 122 and a clamp pad 124. The hex pocket 122 is adapted to receive a hex key tool (not shown) for tightening the split mount beam clamp 100 to the structural member 10. The clamp pad 124 is adapted to contact or engage the structural member 10. For example, as best seen in FIG. 4 and FIG. 6, a bottom surface 125 of the clamp pad 124 engages a top surface 14 of the structural member 10. Additionally, as best seen in FIG. 4 and FIG. 6, the bottom surface 125 of the clamp pad 124 is serrated, which improves the grip of the split mount beam clamp 100 on the structural member 10. Alternatively, the bottom surface 125 of the clamp pad 124 may be smooth (not shown). It is likewise contemplated that the split mount beam clamp 100 may accommodate other types of mounting fasteners 120.

As best seen in FIG. 3, the clamp body 110 includes one or more grounding holes 150. The grounding holes 150 are adapted to receive the grounding fasteners 50. For example, as shown in FIG. 3, the bottom section 114 of the clamp body 110 includes two grounding holes 150. It is likewise contemplated that the clamp body 110 may include any number of grounding holes 150.

In operation, the structural member 10 is inserted into the opening 118 and positioned between the top section 112 and the bottom section 114 of the clamp body 110. The top surface 132 of the contacting section 130 contacts or engages the bottom surface 12 of the structural member 10. When the mounting fasteners 120 are tightened, the bottom surfaces 125 of the clamp pads 124 contact or engage the top surface 14 of the structural member 10. Because the mounting sections 140, and therefore, the mounting fasteners 120, are separated by the slot 142, each of the mounting fasteners 120 acts independently. For example, tightening one of the mounting fasteners 120 will not loosen the other mounting fastener 120.

Figure 8:
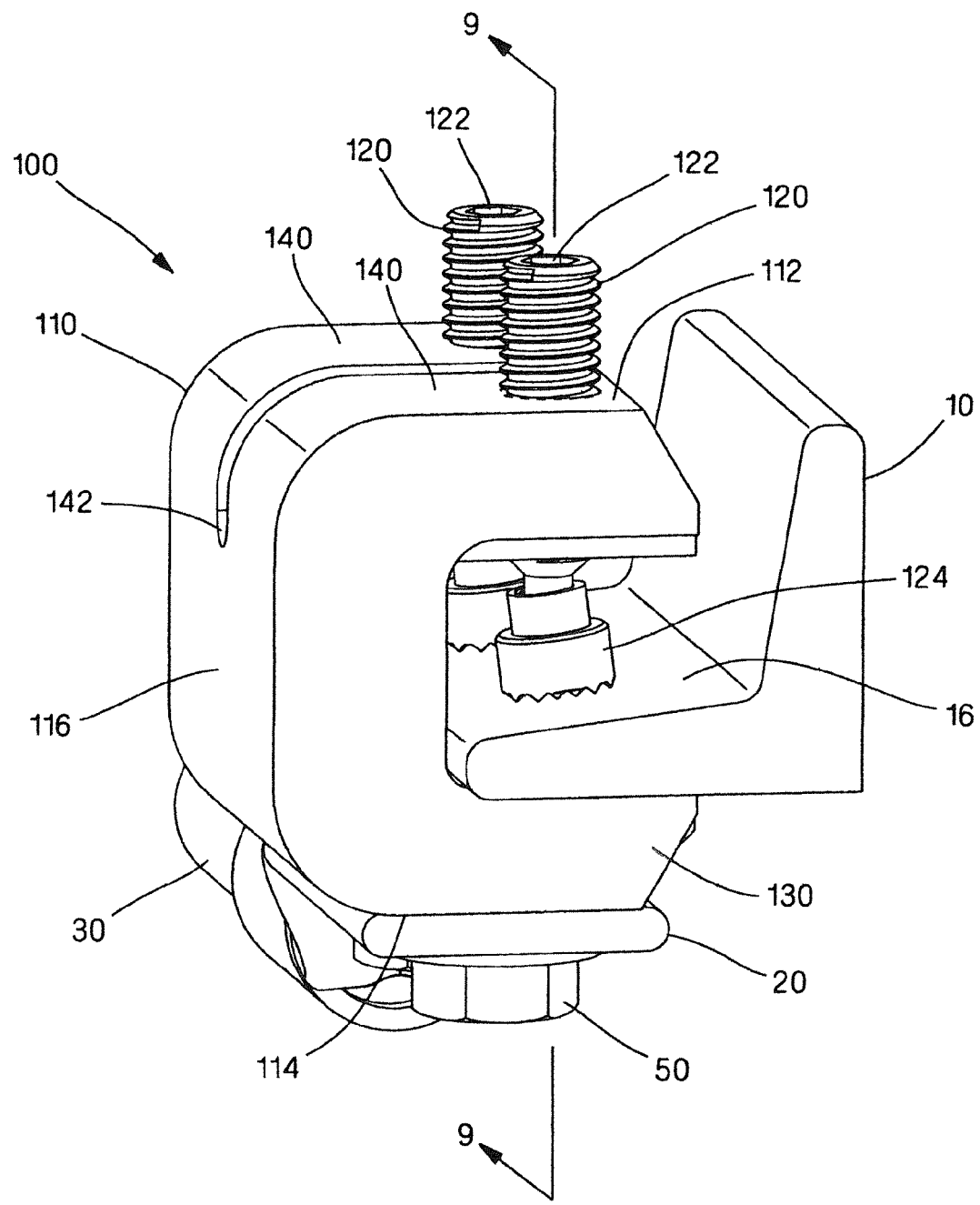
FIG. 8 is a top front perspective view of the split mount beam clamp of FIG. 1, showing the split beam clamp mounted to an angled structural member.

In certain embodiments of the present invention, the split mount beam clamp 100 is adapted to be connected to a structural member 10 that includes an angled top surface 16, as shown in FIG. 8. For example, as best seen in FIG. 9, each of the mounting fasteners 120 includes a ball 126 and a socket 128. More particularly, the ball 126 is rotatably connected to the socket 128. The ball 126 and the socket 128 allow the clamp pads 124 to rotate or swivel, and thus, engage the angled top surface 16 of the structural member 10.

Figure 10:
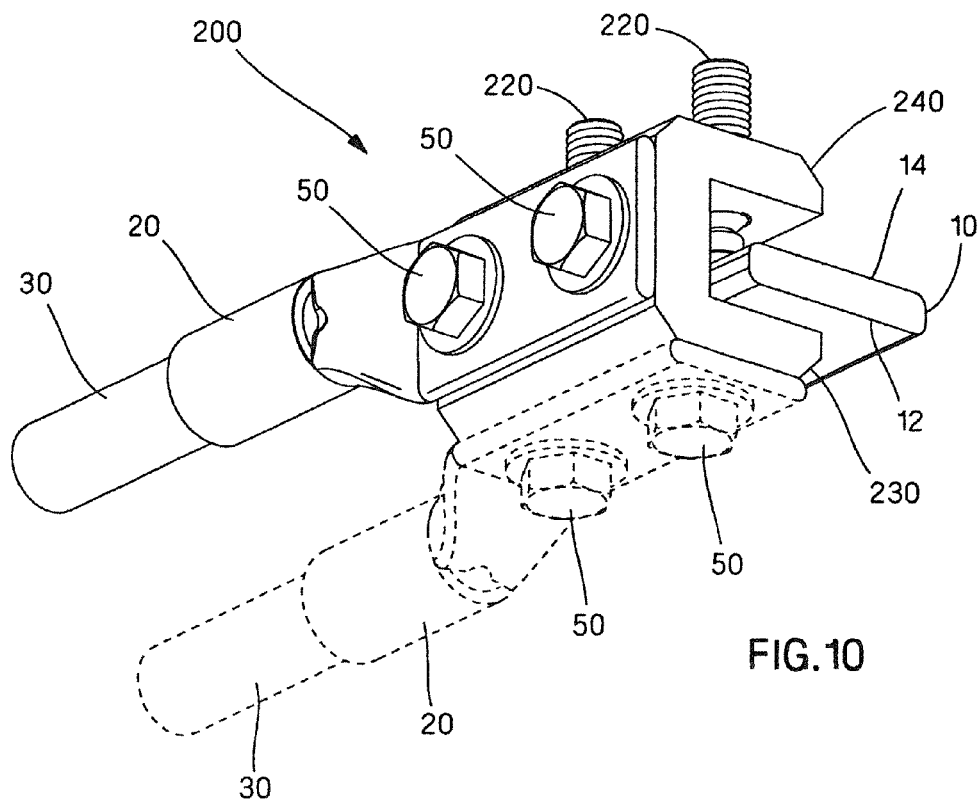
FIGS. 10-11 illustrate a beam clamp with alternate mounting locations according to a second embodiment of the present invention.
Figure 11:
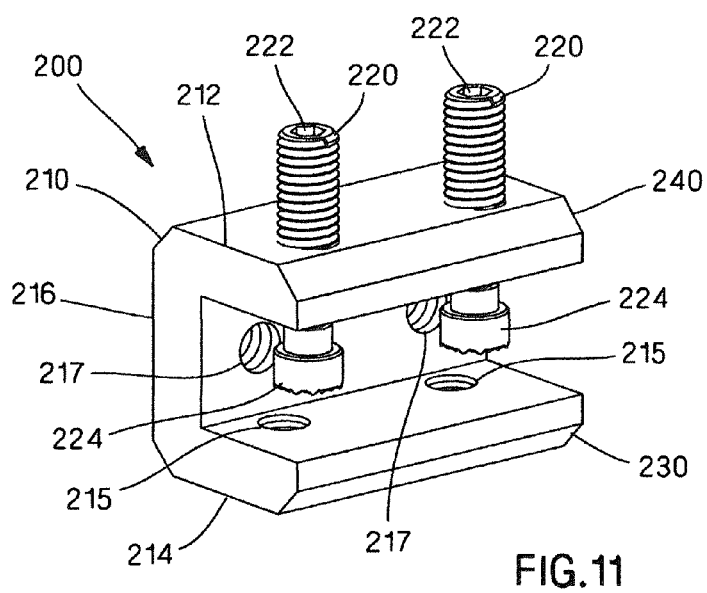

FIGS. 10-11 illustrate a beam clamp 200 with alternate mounting locations according to a second embodiment of the present invention. The beam clamp 200 is similar to the split mount beam clamp 100 of FIGS. 1-9, but it does not include a split mount (e.g., multiple mounting sections 140).

As best seen in FIG. 10, the grounding connector 20 may be connected to the beam clamp 200 in more than one location. For example, as best seen in FIG. 11, the left side section 216 of the clamp body 210 includes a first set of grounding holes 217. The bottom section 214 of the clamp body 210 includes a second set of grounding holes 215. As shown in FIG. 10 in solid lines, the grounding connector 20 is connected to the first set of grounding holes 217. Alternatively, as shown in FIG. 10 in broken lines, the grounding connector 20 may be connected to the second set of grounding holes 215.

Figure 12:
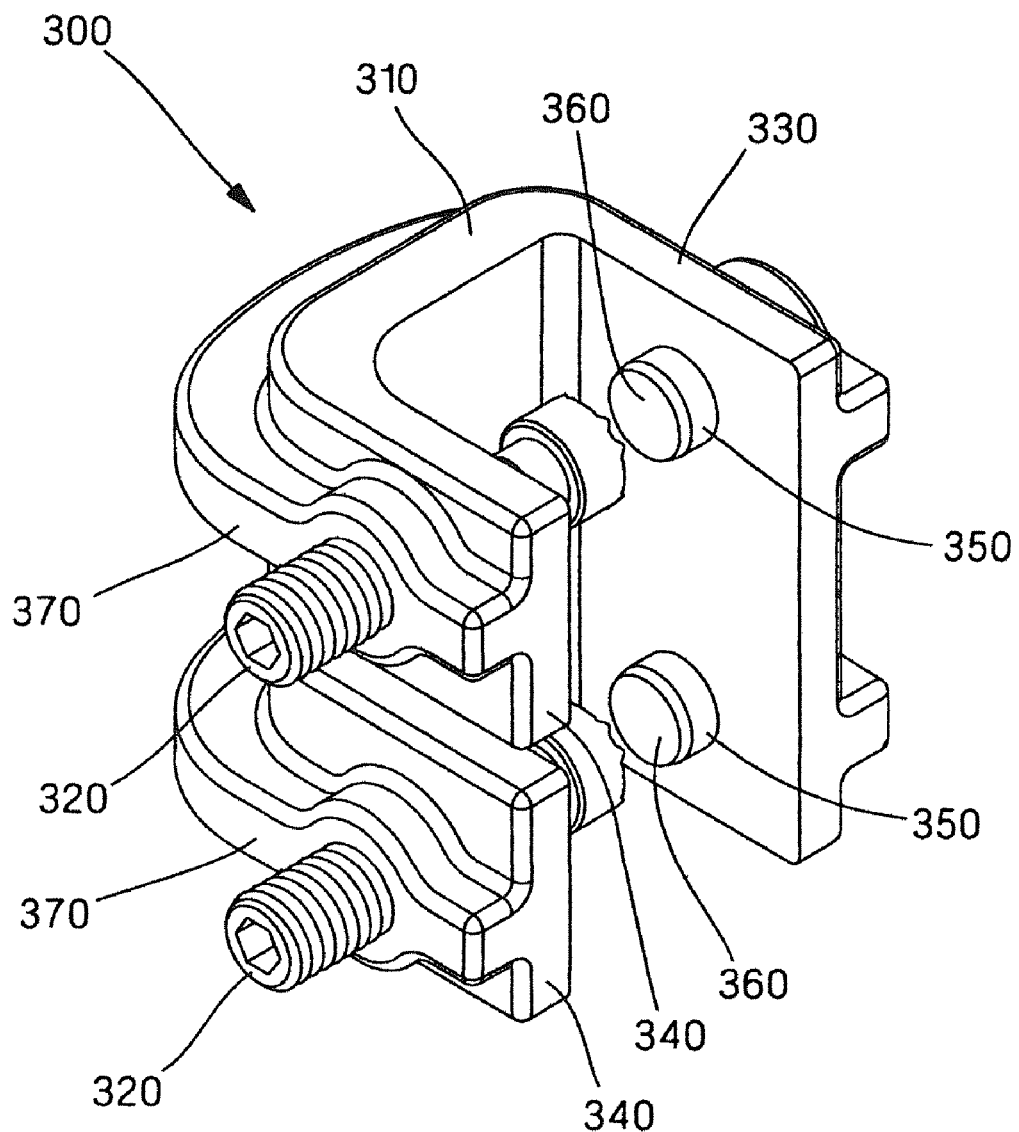
FIGS. 12-13 illustrate a split mount beam clamp with lug locators and reinforcing ribs according to a third embodiment of the present invention.
Figure 13:
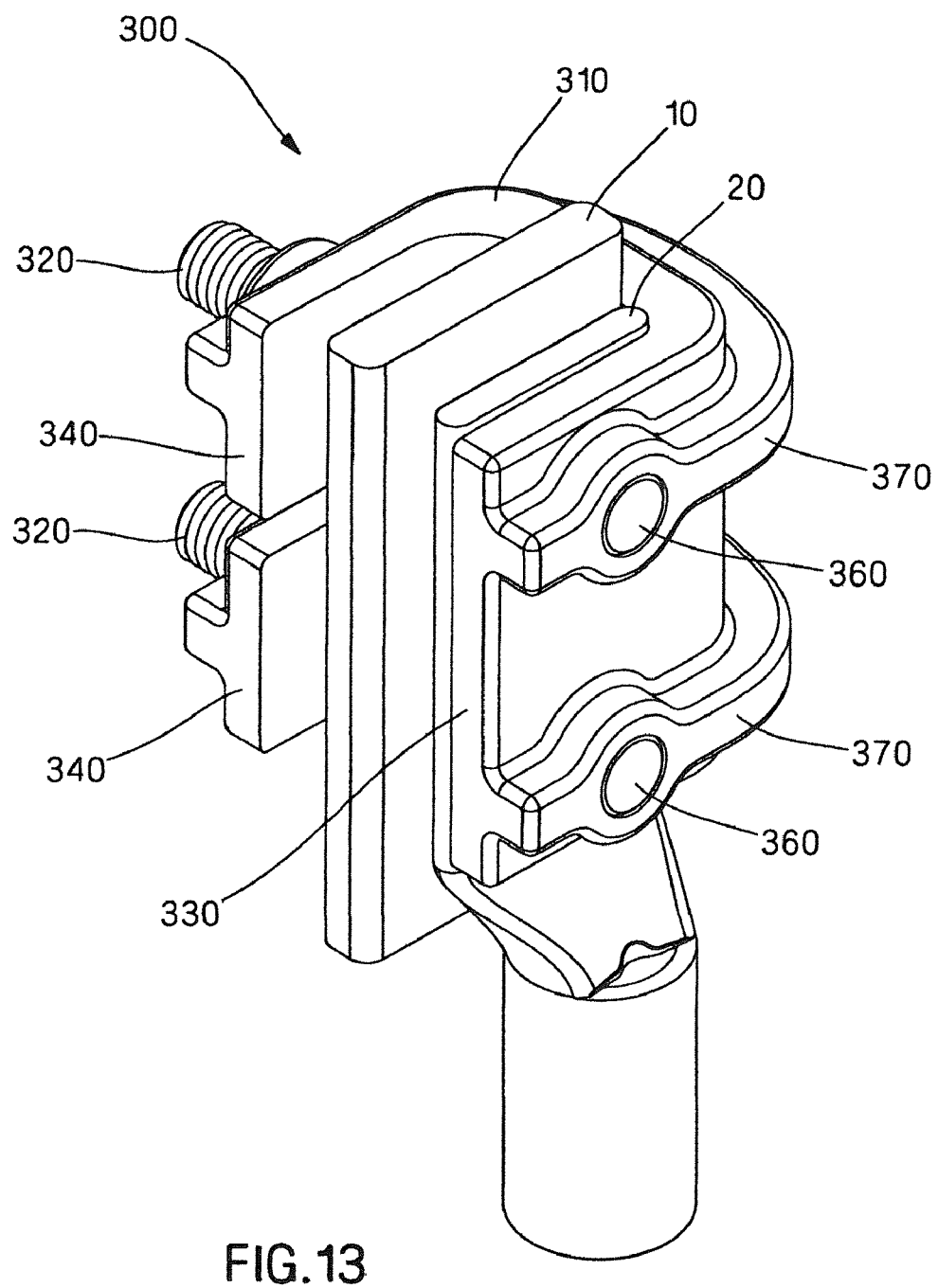

FIGS. 12-13 illustrate a split mount beam clamp 300 with lug locators 360 and reinforcing ribs 370 according to a third embodiment of the present invention. The components 310-350 of the split mount beam clamp 300 are similar to the components 110-150 of the split mount beam clamp 100 of FIGS. 1-9. However, unlike the split mount beam clamp 100, the split mount beam clamp 300 includes one or more lug locators 360 for positioning the grounding connector 20 in the split mount beam clamp 300 while the split mount beam clamp 300 is being secured to the structural member 10. For example, as best seen in FIG. 12, the split mount beam clamp 300 includes two lug locators 360 arranged in a line. Preferably, the shape, size, and pattern of the lug locators 360 correspond to that of the grounding holes 40 in the grounding connector 20. It is likewise contemplated that the split mount beam clamp 300 may include any number of lug locators 360, in a variety of shapes, sizes, and patterns, which allows the split mount beam clamp 300 to accommodate a variety of grounding connectors 20.

In certain embodiments of the present invention, the lug locators 360 may be retractable and/or removable, which also allows the split mount beam clamp 300 to accommodate a variety of grounding connectors 20. For example, as shown in FIGS. 12-13, the lug locators 360 include pins, such as solid dowel pins or hollow spring pins, which are inserted into the holes 350 in the contacting section 330 of the clamp body 310. Alternatively, the clamp body 310 and the lug locators 360 may be integrally formed.

As shown in FIG. 13, the grounding connector 20 is disposed between the split mount beam clamp 300 and the structural member 10 and secured to the structural member 10 using the fasteners 320.

Preferably, the split mount beam clamp 300 is made of copper or copper alloy. However, because the structural member 10 is in direct contact with the grounding connector 20, as shown in FIG. 13, the split mount beam clamp 300 does not have to establish an electrical connection between the structural member 10 and the grounding connector 20. Therefore, the clamp body 310 may be made of more cost effective materials, such as steel, bronze, brass, or aluminum.

Additionally, as shown in FIGS. 12-13, the split mount beam clamp 300 includes one or more reinforcing ribs 370. The reinforcing ribs 370 provide additional support for the split mount beam clamp 300, while reducing the amount of material required, and therefore, the cost of the split mount beam clamp 300.

Figure 14:
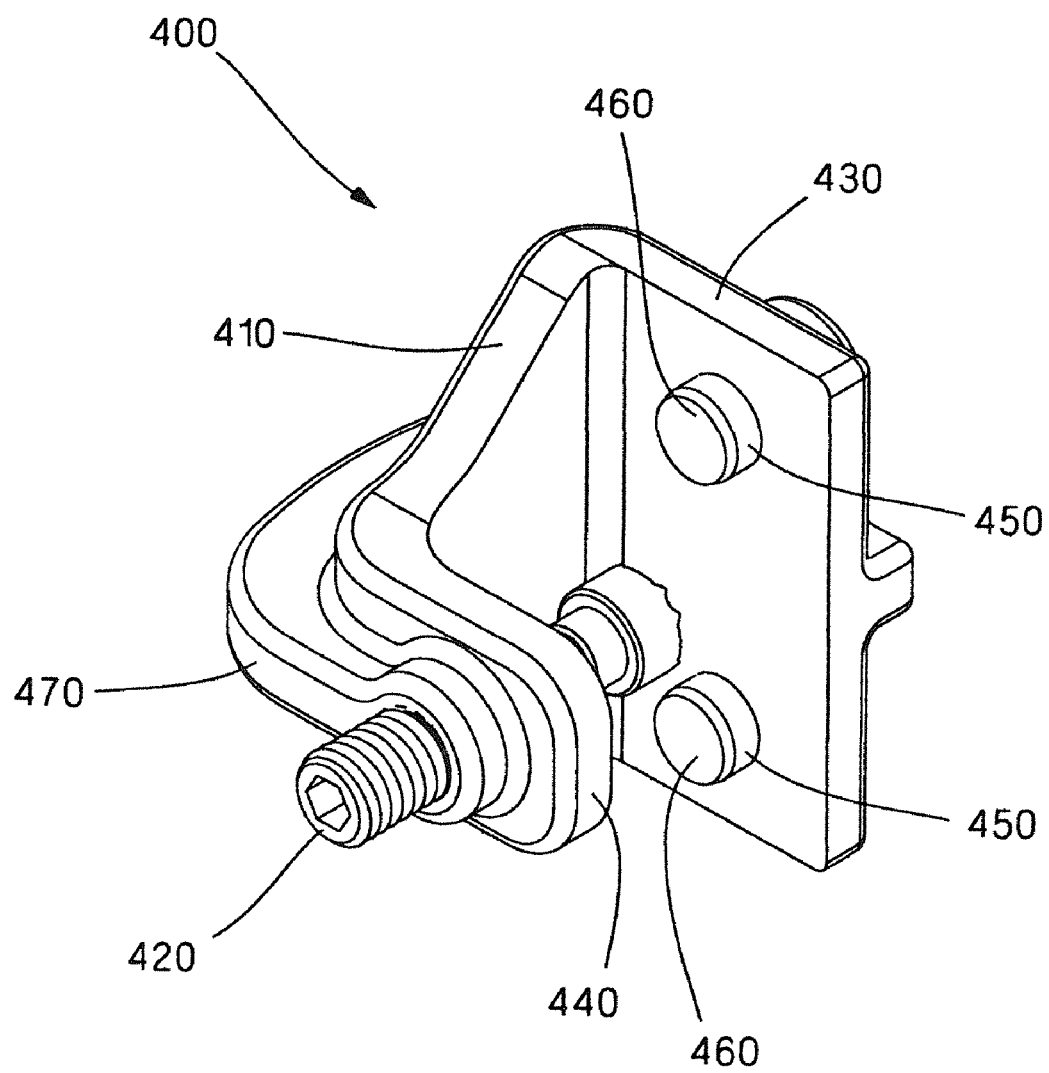
FIGS. 14-15 illustrate a beam clamp with lug locators and reinforcing ribs according to a fourth embodiment of the present invention.
Figure 15:
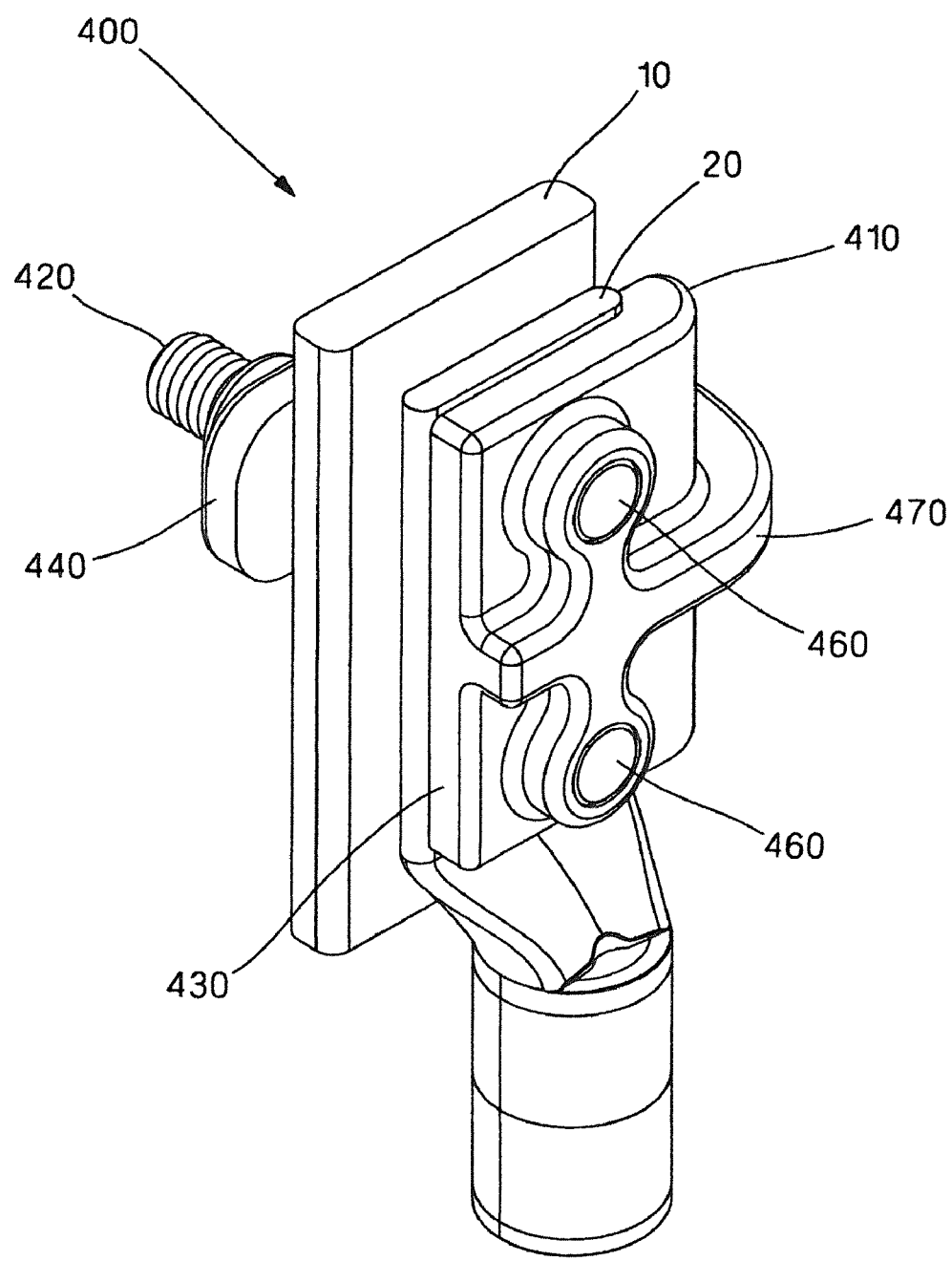

FIGS. 14-15 illustrate a beam clamp 400 with lug locators 460 and reinforcing ribs 470 according to a fourth embodiment of the present invention. The components 410-470 of the beam clamp 400 are similar to the components 310-370 of the split mount beam clamp 300 of FIGS. 12-13. However, unlike the split mount beam clamp 300, the beam clamp 400 does not include a split mount (e.g., multiple mounting sections 340). Rather, as best seen in FIG. 14, the clamp body 410 of the beam clamp 400 includes one mounting section 440.

Figure 16:
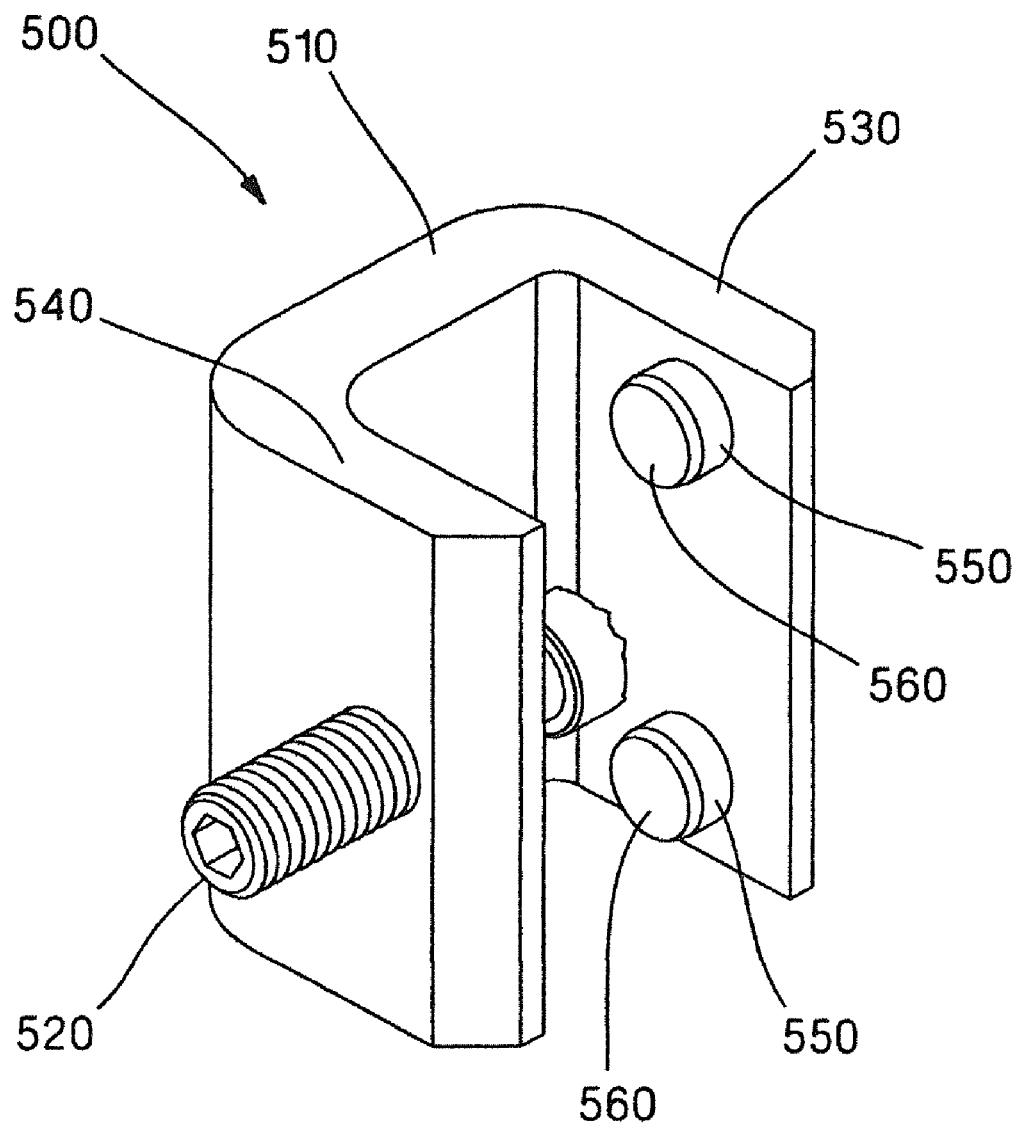
FIGS. 16-17 illustrate a beam clamp with lug locators according to a fifth embodiment of the present invention.
Figure 17:
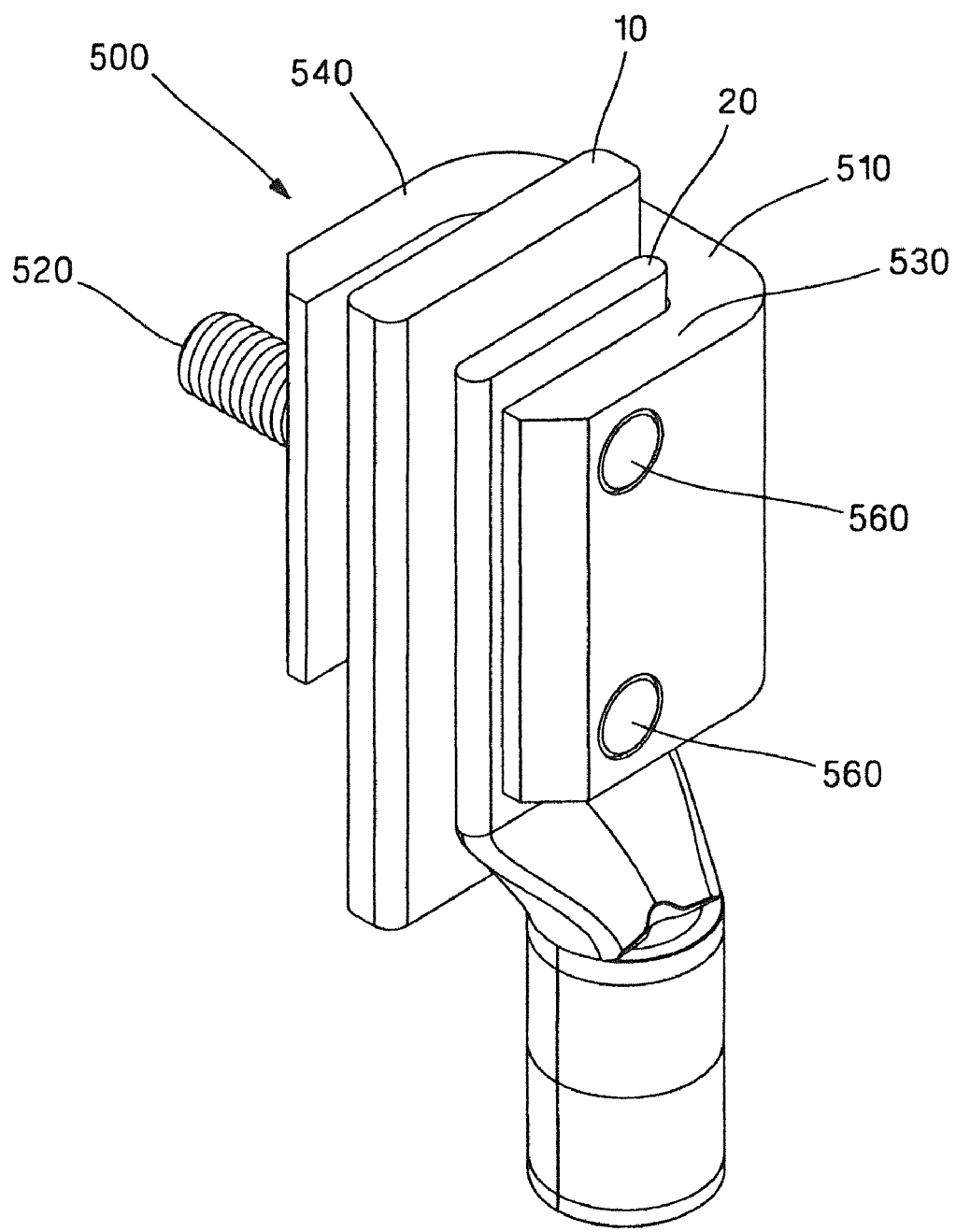

FIGS. 16-17 illustrate a beam clamp 500 with lug locators 560 according to a fifth embodiment of the present invention.

The components 510-560 of the beam clamp 500 are similar to the components 410-460 of the beam clamp 400 of FIGS. 14-15. However, unlike the beam clamp 400, the beam clamp 500 does not include reinforcing ribs (e.g., reinforcing ribs 470). Rather, as best seen in FIG. 16, the clamp body 510 of the beam clamp 500 includes additional material to compensate for the missing reinforcing ribs.

While the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A clamp for securing a grounding connector to a structural member, the clamp comprising:

a clamp body having a top section, a bottom section, and an open side section, the open side section receiving the structural member, wherein the top section has a first mounting section and a second mounting section separated from the first mounting section by a slot, each of the first mounting section and the second mounting section having a mounting hole for receiving a mounting fastener to secure the clamp to the structural member, wherein the grounding connector is secured to the bottom section, wherein the grounding connector has a cable and is electrically connected to the structural member via the clamp body, and wherein the bottom section has a grounding hole for receiving a grounding fastener to secure the grounding connector to the bottom section.

2. The clamp of claim 1, wherein the clamp body is generally C-shaped.

3. The clamp of claim 1, wherein the grounding fasteners are threaded.

4. The clamp of claim 3, wherein the grounding holes are tapped.

5. The clamp of claim 1, wherein the mounting fastener is threaded.

6. The clamp of claim 5, wherein the mounting holes are tapped.

7. The clamp of claim 1, wherein the mounting fastener has a hex pocket.

8. The clamp of claim 1, wherein the mounting fastener has a clamp pad.

9. The clamp of claim 8, wherein a bottom surface of the clamp pad is smooth.

10. The clamp of claim 8, wherein a bottom surface of the clamp pad is serrated.

11. The clamp of claim 8, wherein the clamp pad is rotatably connected to the mounting fastener.

12. The clamp of claim 11, wherein the mounting fastener has a ball and the clamp pad has a socket for receiving the ball.

\* \* \* \* \*